United States Patent
Denda et al.

(12)
(10) Patent No.: US 9,334,411 B2
(45) Date of Patent: May 10, 2016

(54) AQUEOUS PIGMENT DISPERSION AND AQUEOUS INK COMPOSITION CONTAINING THE SAME

(71) Applicant: Seiko Epson Corporation, Tokyo (JP)

(72) Inventors: Atsushi Denda, Chino (JP); Naoki Koike, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/504,726

(22) Filed: Oct. 2, 2014

(65) Prior Publication Data

US 2015/0096466 A1    Apr. 9, 2015

(30) Foreign Application Priority Data

Oct. 3, 2013 (JP) .................. 2013-208131

(51) Int. Cl.
| | |
|---|---|
| C09D 11/02 | (2014.01) |
| C09D 11/322 | (2014.01) |
| C08K 5/42 | (2006.01) |
| C08K 5/52 | (2006.01) |
| C08K 3/08 | (2006.01) |

(52) U.S. Cl.
CPC ............... C09D 11/322 (2013.01); C08K 5/42 (2013.01); C08K 5/52 (2013.01); C08K 2003/0812 (2013.01)

(58) Field of Classification Search
CPC .......... C09D 11/322; C08K 5/42; C08K 5/52; C08K 3/08
See application file for complete search history.

(56) References Cited

U.S. PATENT DOCUMENTS

| | | | | |
|---|---|---|---|---|
| 6,281,277 B1* | 8/2001 | Ishii | ............ | B82Y 30/00 423/111 |
| 2007/0028807 A1* | 2/2007 | Wallquist | ............ | C09B 57/004 106/494 |
| 2008/0081864 A1 | 4/2008 | Takano | | |
| 2010/0326323 A1* | 12/2010 | Abe | ............ | C01G 23/006 106/449 |
| 2011/0008613 A1 | 1/2011 | Takano et al. | | |
| 2011/0110992 A1* | 5/2011 | Garrison | ............ | A61K 8/25 424/401 |
| 2015/0112003 A1* | 4/2015 | Toyoda | ............ | C09D 11/03 524/130 |

FOREIGN PATENT DOCUMENTS

| | | |
|---|---|---|
| JP | 2003-213157 A | 7/2003 |
| JP | 2006-169393 A | 6/2006 |
| JP | 2009-215411 A | 9/2009 |
| JP | 2012-251070 A | 12/2012 |
| JP | 2013-122008 A | 6/2013 |

* cited by examiner

*Primary Examiner* — Veronica F Faison
(74) *Attorney, Agent, or Firm* — Harness, Dickey & Pierce, P.L.C.

(57) ABSTRACT

Disclosed is an aqueous pigment dispersion including water and a base metal pigment, in which the base metal pigment is a base metal pigment which is surface-treated with a fluorine-based compound, and when performing an X-ray Photoelectron Spectroscopy analysis of a base metal pigment surface, a concentration of a fluorine element is 21 atm % to 35 atm %.

17 Claims, No Drawings

AQUEOUS PIGMENT DISPERSION AND AQUEOUS INK COMPOSITION CONTAINING THE SAME

BACKGROUND

1. Technical Field

The present invention relates to an aqueous pigment dispersion and an aqueous ink composition containing the same.

2. Related Art

As a method of forming a coating film having metallic gloss on a printed matter, a die-stamping using a printing ink in which gold powders or silver powders produced from brass or aluminum fine particles are used as a pigment, or a metal foil, and a thermal transfer method using a metal foil have been used in the related art. However, in these methods, there is a problem in which a fine pattern is not easily formed, or application to a curved surface portion is difficult. In addition, in the die-stamping, there is a problem in which on-demand property is low, a response to a multi-product production is difficult, and it is not possible to print a metal tone image with a gradient.

On the other hand, since a powder coating material containing a metal pigment is a low-pollution coating material in which an organic solvent is not used, a demand for the powder coating material is increasing in various industries. However, in a case of the powder coating material containing the metal pigment, if the metal pigment cannot be arranged in parallel to a substrate of a coating film, there is a disadvantage that a color tone of the coating film becomes dark, and a sufficient metallic feeling is not obtained. To overcome such a disadvantage, for example, JP-A-2003-213157 and JP-A-2006-169393 disclose powders for coating material obtained by coating the surfaces of aluminum particles with a fluorine-based (co)polymer which has fluorine-containing (meth) acrylic acid ester as an essential monomer. In addition, JPA-2009-215411 discloses powders for coating material obtained by coating the surfaces of aluminum particles with a polymerizable fluorine-based (co)polymer which has fluorine-based polymerizable monomers and polymerizable monomers having phosphate groups as an essential monomer.

In recent years, many application examples to ink jet printing have been seen, and as an application example of these, there is a metallic print, and development of an ink having metallic gloss is in progress. The ink jet method is excellent since it can also be suitably applied to the formation of a fine pattern and recording on the curved surface portion. For example, JP-A-2012-251070 and JP-A-2013-122008 disclose an ultraviolet-ray curable type ink jet composition including metal particles and a polymerizable compound.

On the other hand, from the viewpoint of the global environment, safety to the human body, or the like, development of an aqueous ink composition which does not contain an organic solvent or a polymerizable compound, and can form a metallic gloss image has been desired.

However, when a base metal pigment, in particular, an aluminum pigment is dispersed in water, hydrogen gas is generated by a reaction with water, and whitening occurs by forming alumina. Thus, the metallic glossiness of the aluminum pigment is impaired. For example, the aluminum pigment formed by coating with a fluorine-based (co)polymer as disclosed in JP-A-2003-213157, JP-A-2006-169393, and JP-A-2009-215411 is not intended to improve waterfastness, and thus, in a case where the aluminum pigment is mixed with an aqueous ink composition, the aluminum pigment is still insufficient from the viewpoint of waterfastness and suppressing the aggregation of the aluminum pigments. In addition, the metal particles disclosed in JP-A-2012-251070 and JP-A-2013-122008 are also not intended to improve waterfastness, and thus, the metal particles are still insufficient from the viewpoint of waterfastness and suppressing the aggregation of the metal particles. From this point of view, an aqueous pigment dispersion which has not only excellent metallic glossiness when mixed with an aqueous coating material or an aqueous ink composition but also excellent dispersion stability (hereinafter, referred to as "water dispersibility") in the aqueous coating material or the aqueous ink composition has been required.

SUMMARY

An advantage of some aspects of the invention is to provide an aqueous pigment dispersion which has excellent metallic glossiness and especially good water dispersibility and an aqueous ink composition containing the same.

The invention can be realized as the following forms or application examples.

Application Example 1

According to an aspect of the invention, there is provided an aqueous pigment dispersion including water and a base metal pigment, in which the base metal pigment is a base metal pigment which is surface-treated with a fluorine-based compound, and when performing an X-ray Photoelectron Spectroscopy (XPS) analysis of a base metal pigment surface, a concentration of a fluorine element is 21 atm % to 35 atm %.

According to the aqueous pigment dispersion of Application Example 1, since a layer having a fluorine element with a high concentration on the surface of the base metal pigment is formed, waterfastness is significantly improved, and it is possible to suppress the reaction between the base metal pigment and water. Thus, it is possible to obtain an aqueous pigment dispersion having excellent metallic glossiness and water dispersibility.

Application Example 2

In the aqueous pigment dispersion of Application Example 1, when performing the XPS analysis of the base metal pigment surface, a concentration of phosphorus, sulfur, nitrogen, or a total of these elements may be 0.8 atm % or greater.

Application Example 3

In the aqueous pigment dispersion of Application Example 1 or 2, the fluorine-based compound may have a perfluoroalkyl group.

Application Example 4

In the aqueous pigment dispersion of Application Example 3, the number of carbon atoms in the perfluoroalkyl group may be 1 to 6.

Application Example 5

In the aqueous pigment dispersion of any one of Application Examples 1 to 4, when performing the XPS analysis of the base metal pigment surface, a ratio ([F]/[O]) of a concentration of the fluorine element ([F]; atm %) to a concentration of an oxygen element ([O]; atm %) may be 0.7 to 1.2.

Application Example 6

In the aqueous pigment dispersion of any one of Application Examples 1 to 5, a base metal included in the base metal pigment may be aluminum or an aluminum alloy.

Application Example 7

In the aqueous pigment dispersion of Application Example 6, when performing the XPS analysis of the base metal pigment surface, a ratio ([F]/[Al]) of a concentration of the fluorine element ([F]; atm %) to a concentration of an aluminum element ([Al]; atm %) may be 0.7 to 1.2.

Application Example 8

In the aqueous pigment dispersion of any one of Application Examples 1 to 7, a molecular weight of the fluorine-based compound may be 1,000 or less.

Application Example 9

According to another aspect of the invention, there is provided an aqueous ink composition including the aqueous pigment dispersion of any one of Application Examples 1 to 8.

Application Example 10

In the aqueous ink composition according to Application Example 9, a polymerizable compound substantially may not be contained.

DESCRIPTION OF EXEMPLARY EMBODIMENTS

Hereinafter, the preferred embodiments of the invention will be described. The embodiments described below merely describe an example of the invention. In addition, the invention is not limited to the following embodiments and includes various modifications performed within the range without departing from the gist of the invention.

Hereinafter, an aqueous pigment dispersion and an aqueous ink composition will be described in this order.

1. Aqueous Pigment Dispersion

An aqueous pigment dispersion according to the embodiment is a pigment dispersion including water and a base metal pigment, in which the base metal pigment is a base metal pigment which is surface-treated with a fluorine-based compound, and when performing an XPS analysis (X-ray Photoelectron Spectroscopy) of a base metal pigment surface, a concentration of a fluorine element is 21 atm % to 35 atm %.

According to an aspect of the invention, the "base metal" may be any metal having a larger ionization tendency than hydrogen, and for example, the "base metal" has a concept including simple substances of metals such as alkali metals, alkali earth metals, aluminum, iron, zinc, lead, copper, nickel, cobalt, and chromium, and alloys thereof.

The base metal pigment included in the aqueous pigment dispersion according to the embodiment is an aqueous pigment dispersion in which pigment particles (hereinafter, pigment particles constituted with a material including the base metal before being surface-treated is also referred to as "base particles") constituted with a material including the base metal is surface-treated with a fluorine-based compound. That is, the base metal pigment included in the aqueous pigment dispersion according to the embodiment has a structure in which a surface of the pigment particles (base particles) constituted with a material including the base metal is coated with a single layer or plural layers containing the fluorine-based compound.

1.1. Base Particles

First, the pigment particles (base particles) constituted with a material including the base metal will be described. The base particles may be particles in which a region including at least the vicinity of the surface is constituted with the base metal, and the whole is constituted with the base metal. In addition, the base particles may have a base portion constituted with a non-metallic material and a film constituted with the base metal which covers the base portion.

As the base metal constituting the base particles, which is not particularly limited as long as it corresponds with the definition of the base metal, aluminum or an aluminum alloy is preferable from the viewpoint of securing the metallic glossiness and cost. When aluminum or an aluminum alloy is dispersed in water, hydrogen gas is generated by a reaction with water, and whitening occurs by forming aluminum hydroxide or alumina. By this reaction, aluminum or an aluminum alloy has a problem in which the metallic glossiness is impaired. In contrast, according to an aspect of the invention, since the waterfastness of the base metal pigment is significantly improved by using the base metal pigment coated with a single layer or plural layers containing the fluorine-based compound, it is possible to prevent the generation of the problem.

In addition, the base particles may be particles manufactured by any method, and for example, particles obtained by a method in which a film formed of the base metal is formed on a surface on one side of a sheet shape substrate using a vapor deposition method, and then, the film formed of the base metal is peeled from the sheet shape substrate and pulverized are preferable. In place of the vapor deposition method, an ion plating method or a sputtering method may also be used. According to this method, since variation in a film thickness is small and scale shape base particles having high flatness of the surface is obtained, it is possible to more effectively exhibit the metallic glossiness which the base particles originally have.

As the sheet shape substrate, for example, plastic films such as polyethylene terephthalate can be used. In addition, a release agent such as silicone oil may be coated on the film-forming surface of the sheet shape substrate in advance in order to improve releasability, and a resin layer for peeling may be formed. Examples of the resin used in the resin layer for peeling include polyvinyl alcohol, polyvinyl butyral, polyethylene glycol, polyacrylic acid, polyacrylamide, cellulose derivatives such as cellulose acetate butyrate, and a modified nylon resin. The peeling and pulverization, for example, are performed by irradiating the film in a non-aqueous medium with ultrasonic waves, or by applying an external force by stirring with a homogenizer or the like.

As the non-aqueous medium in a case of performing peeling and pulverization in such a manner as described above, alcohol such as methanol, ethanol, propanol, and butanol; hydrocarbon-based compounds such as n-heptane, n-octane, decane, dodecane, tetradecane, toluene, xylene, cymene, durene, indene, dipentene, tetrahydronaphthalene, decahydronaphthalene, and cyclohexyl benzene; ether-based compounds such as ethylene glycol dimethyl ether, ethylene glycol diethyl ether, ethylene glycol methyl ethyl ether, diethylene glycol dimethyl ether, diethylene glycol diethyl ether, diethylene glycol methyl ethyl ether, diethylene glycol monobutyl ether acetate, diethylene glycol n-butyl ether, tripropylene glycol dimethyl ether, triethylene glycol diethyl ether, propylene glycol monomethyl ether acetate, 1,2-dimethoxyethane, bis(2-methoxyethyl) ether, and p-dioxane; and polar organic solvents such as propylene carbonate, γ-butyrolactone, N-methyl-2-pyrrolidone, N,N-dimethylformamide, N,N-dimethylacetamide, dimethyl sulfoxide, cyclohexanone, and acetonitrile can be suitably used. By using such a non-aqueous medium, it is possible to reduce the variation in the size, the shape, and characteristics of each particle while preventing the unwanted oxidation or the like of the base particle.

Moreover, since the preferable average particle diameter and the preferable average thickness of the base particles are almost the same as the average particle diameter and the average thickness of the base metal pigment described below, here, descriptions will not be repeated.

1.2. Fluorine-based Compound

Next, the fluorine-based compound used in a surface treatment of the base particles will be described. As described above, the base metal pigment included in the aqueous pigment dispersion according to the embodiment is a base metal pigment in which the base particles are surface-treated with the fluorine-based compound. As such a fluorine-based compound, fluorine-based phosphonic acid, fluorine-based carboxylic acid, fluorine-based sulfonic acid, and salts thereof can be preferably used. When using these fluorine-based compounds, a phosphate group, a carboxyl group, or a sulfonate group is bonded to the surfaces of the base particles and by this, a coating film is formed, and thus a base metal pigment with improved waterfastness can be obtained. Thus, it is possible to effectively suppress the reaction of the base metal pigment with water in the aqueous medium, and an aqueous pigment dispersion also having excellent water dispersibility can be obtained. Among these, since the phosphate group is particularly excellent in the binding ability to the base particle surface, fluorine-based phosphonic acid and salts thereof are more preferable.

As the fluorine-based phosphonic acid and salts thereof, compounds having a structure represented by the following general formula (1) are preferable.

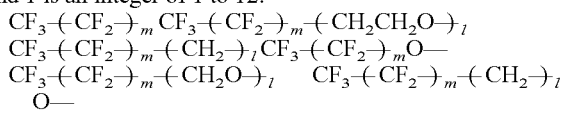

(1)

In the formula (1), each $R^1$ is independently one group selected from the following structural formulas, and each M is independently a hydrogen atom, a monovalent metal ion, an ammonium ion, or $-NR^2R^3R^4$. Each of $R^2$, $R^3$, and $R^4$ is independently a hydrogen atom or a $C_2H_4OH$ group, and a case where all of $R^2$, $R^3$, and $R^4$ are hydrogen atoms is excluded. n is an integer of 1 to 3, m is an integer of 1 to 12, and l is an integer of 1 to 12.

$CF_3{\text -}(CF_2{\text -})_m$  $CF_3{\text -}(CF_2{\text -})_m{\text -}(CH_2CH_2O{\text -})_l$
$CF_3{\text -}(CF_2{\text -})_m{\text -}(CH_2{\text -})_l$ $CF_3{\text -}(CF_2{\text -})_mO{\text -}$
$CF_3{\text -}(CF_2{\text -})_m{\text -}(CH_2O{\text -})_l$  $CF_3{\text -}(CF_2{\text -})_m{\text -}(CH_2{\text -})_l$O${\text -}$ In the formula (1), m is an integer of 1 to 12, and preferably an integer of 1 to 8, and more preferably an integer of 1 to 5. In addition, l is an integer of 1 to 12, and preferably an integer of 1 to 10, and more preferably an integer of 1 to 6. When m and l are in the ranges, effects as described above are more significantly exhibited.

As the fluorine-based phosphonic acid, compounds represented by the following general formula (2) are particularly preferable from the viewpoint of the excellent balance between the improvement of adsorption ability to the base particle surface and the improvement of waterfastness.

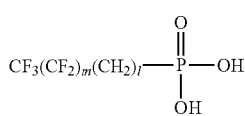

(2)

In the formula (2), m is an integer of 1 to 12, and preferably an integer of 1 to 8, and more preferably an integer of 1 to 5. In addition, l is an integer of 1 to 12, and preferably an integer of 1 to 10, and more preferably an integer of 1 to 6. When m and l are in the ranges, effects as described above are more significantly exhibited.

As the carboxylic acid and salts thereof, compounds having a structure represented by the following general formula (3) are preferable.

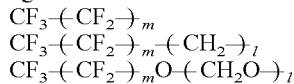

(3)

In the formula (3), $R^5$ is one group selected from the following structural formulas, and M is a hydrogen atom, a monovalent metal ion, or an ammonium ion. m is an integer of 1 to 12, and preferably an integer of 1 to 8, and more preferably an integer of 1 to 5. In addition, l is an integer of 1 to 12, and preferably an integer of 1 to 10, and more preferably an integer of 1 to 6.

$CF_3{\text -}(CF_2{\text -})_m$
$CF_3{\text -}(CF_2{\text -})_m{\text -}(CH_2{\text -})_l$
$CF_3{\text -}(CF_2{\text -})_mO{\text -}(CH_2O{\text -})_l$ As the fluorine-based sulfonic acid and salts thereof, compounds having a structure represented by the following general formula (4) are preferable.

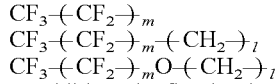

(4)

In the formula (4), $R^6$ is one group selected from the following structural formulas, and M is a hydrogen atom, a monovalent metal ion, or an ammonium ion. m is an integer of 4 to 17, and l is an integer of 1 to 12.

$CF_3{\text -}(CF_2{\text -})_m$
$CF_3{\text -}(CF_2{\text -})_m{\text -}(CH_2{\text -})_l$
$CF_3{\text -}(CF_2{\text -})_mO{\text -}(CH_2{\text -})_l$ In addition, the fluorine-base compound preferably has a perfluoroalkyl group ($C_nF_{2n+1}{\text -}$) in at least a part of the structure, and the number of carbon atoms in the perfluoroalkyl group is more preferably 1 to 6. When the fluorine-based compound has such a structure, the waterfastness is improved, and a base metal pigment having excellent metallic glossiness and water dispersibility is easily obtained.

Moreover, the molecular weight of the fluorine-based compound is preferably 1,000 or less. In a case where the fluorine-based compound which is adsorbed to the surfaces of the base particles is a fluorine-based polymer disclosed in JP-A-2003-213157, JP-A-2006-169393, and JP-A-2009-215411, since coating becomes excessively thick, and by this, not only metallic glossiness is impaired, but also the interaction between the base metal pigments on which the coating film is formed becomes stronger, the water dispersibility is significantly reduced in some cases. For this reason, the film formed on the surfaces of the base particles is preferably a monomolecular film formed of the fluorine-based compound having a molecular weight of 1,000 or less.

1.1.3. Manufacturing Method of Aqueous Pigment Dispersion

For example, the aqueous pigment dispersion according to the embodiment can be manufactured as follows.

First, a dispersion in which the base particles were dispersed in a non-aqueous medium is prepared. After diluting this dispersion with a different or same non-aqueous medium as necessary, by stirring the diluted dispersion with a stirrer such as a homogenizer such that the average particle diameter of the base particles becomes 3 μm or less, a pulverization treatment is performed on the base particles. The reaction time of the pulverization treatment, which is not particularly limited, is generally 3 hours to 24 hours. In addition, examples of the non-aqueous medium used for dilution include the same non-aqueous medium as the non-aqueous medium in a case of performing peeling and pulverization exemplified above.

Next, a fluorine-based compound is added to the dispersion in which the base particles subjected to the pulverization treatment is dispersed in a non-aqueous medium, and by irradiating with ultrasonic waves, a coating film of the fluorine-based compound is formed on the surface of the base particles. In this manner, a base metal pigment in which the surfaces of the base particles are treated with the fluorine-based compound is obtained. The added amount of the fluorine-based compound is preferably 1 part by mass to 70 parts by mass, more preferably 5 parts by mass to 40 parts by mass, and even more preferably 15 parts by mass to 30 parts by mass with respect to 100 parts by mass of the base particles. In addition, when surface-treating by irradiating with ultrasonic waves, heating may be performed. The heating temperature is preferably 40° C. or higher. It is considered that by the heat treatment, a covalent bond between the surfaces of the base particles and the fluorine-based compound is formed and the bonding strength is strengthened.

The surface treatment of the base particles with a fluorine-based compound may be directly performed on the surfaces of the base particles, and a treatment with a fluorine-based compound may be performed with respect to the base particles which are treated with an acid or a base in advance. Thus, it is possible to more reliably perform a chemical modification with a fluorine-based compound on the mother particle surface, and it is possible to more effectively exhibit the effects of an aspect of the invention as described above. In addition, even in a case where an oxide coating film is formed on the surfaces of the particles to be the base particles before performing the surface treatment with a fluorine-based compound, it is possible to remove the oxide coating film, and it is possible to perform the surface treatment with a fluorine-based compound in a state where the oxide coating film is removed, and thus it is possible to make the metallic glossiness of the base metal pigment to be produced be excellent. As such an acid, for example, protonic acids such as hydrochloric acid, sulfuric acid, phosphoric acid, nitric acid, boric acid, acetic acid, carbonic acid, formic acid, benzoic acid, chlorous acid, hypochlorous acid, sulfurous acid, hyposulfurous acid, nitrous acid, hyponitrous acid, phosphorous acid, and hypophosphorous acid can be used. On the other hand, as the base, for example, sodium hydroxide, potassium hydroxide, and calcium hydroxide can be used.

Next, solvent replacement is performed. Specifically, a dispersion in which the base metal pigment is dispersed in a non-aqueous medium is centrifuged, the supernatant thereof is removed, an appropriate amount of an aqueous medium is added thereto, and the base metal pigment is dispersed in the aqueous medium by irradiating with ultrasonic waves. In this manner, an aqueous pigment dispersion in which the base metal pigment is dispersed is obtained. In addition, the aqueous pigment dispersion obtained in this manner is also preferably further heat-treated. It is considered that the fluorine-based compound which is bound to the surfaces of the base particles by an ionic bond forms a covalent bond by dehydration by heating, and the base particles and the fluorine-based compound can be more strongly bonded, and it is possible to more effectively exhibit the effects of an aspect of the invention as described above. The heating temperature is preferably 50° C. or higher, and more preferably 60° C. or higher. The heat treatment time is preferably 1 day to 10 days.

The aqueous medium may be a medium containing water as a main component, and an organic solvent, a surfactant, a tertiary amine, a pH adjuster, or the like may be further added thereto. The content ratio of water in the aqueous medium is preferably 20% by mass or greater, more preferably 30% by mass or greater, and particularly preferably 45% by mass or greater.

As the organic solvent which can be added to the aqueous medium, a polar organic solvent is preferable from the viewpoint of compatibility with water. Examples of such a polar organic solvent include alcohols (methyl alcohol, ethyl alcohol, propyl alcohol, butyl alcohol, isopropyl alcohol, and fluorinated alcohol), ketones (acetone, methyl ethyl ketone, and cyclohexanone), carboxylic acid esters (methyl acetate, ethyl acetate, propyl acetate, butyl acetate, methyl propionate, and ethyl propionate), ethers (diethyl ether, dipropyl ether, tetrahydrofuran, and dioxane), polyols (ethylene glycol, diethylene glycol, triethylene glycol, polyethylene glycol, polypropylene glycol, propylene glycol, butylene glycol, 1,2,6-hexane triol, thioglycol, hexylene glycol, glycerin, trimethylol ethane, and trimethylol propane), and glycol ether-based solvents (alkylene glycol monoethers such as triethylene glycol monobutyl ether and alkylene glycol diether such as diethylene glycol diethyl ether). The content ratio of the organic solvent in the aqueous medium is preferably 60% by mass or less, and more preferably 45% by mass to 55% by mass. When the content ratio of the organic solvent is in the range, the waterfastness of the base metal pigment is improved and the metallic glossiness is good in some cases.

As the surfactant which can be added to the aqueous medium, a fluorine-based surfactant and/or a silicon-based surfactant is preferable. The content ratio of the surfactant in the aqueous medium is preferably 3% by mass or less, more preferably 0.01% by mass to 2% by mass, and particularly preferably 0.1% by mass to 1% by mass. When the content ratio of the surfactant is in the range, there is a tendency that the waterfastness of the base metal pigment is further improved. In addition, a function as a slipping agent when a metallic gloss image is recorded is exhibited, and the effect in which the friction resistance of an image is improved is obtained in some cases.

Examples of the fluorine-based surfactant include Megafac F-430, Megafac F-444, Megafac F-472SF, Megafac F-475, Megafac F-477, Megafac F-552, Megafac F-553, Megafac F-554, Megafac F-555, Megafac F-556, Megafac F-558, Megafac R-94, Megafac RS-75, and Megafac RS-72-K (hereinbefore, trade names, manufactured by DIC Corporation); EFTOP EF-351, EFTOP EF-352, EFTOP EF-601, EFTOP EF-801, and EFTOP EF-802 (hereinbefore, trade names, manufactured by Mitsubishi Materials Corporation); FTERGENT 222F, FTERGENT 251, and FTX-218 (hereinbefore, trade names, manufactured by Neos Company Limited); and SURFLON SC-101, and SURFLON KH-40 (hereinbefore, trade names, manufactured by AGC SEIMI CHEMICAL CO., LTD.).

Examples of the silicone-base surfactant include BYK-300, BYK-306, BYK-310, BYK-320, BYK-330, BYK-344, BYK-346, BYK-UV3500, and BYK-UV3570 (hereinbefore, trade names, manufactured by BYK Japan KK); and KP-341, KP-358, KP-368, KF-96-50CS, and KF-50-100CS (hereinbefore, trade names, manufactured by Shin-Etsu Chemical Co., Ltd.).

Examples of the tertiary amine which can be added to the aqueous medium include hydroxylamines such as triethanolamine, tripropanolamine, tributanolamine, N,N-dimethyl-2-aminoethanol, and N,N-diethyl-2-aminoethanol. By adding a tertiary amine into an aqueous medium, the water dispersibility of the base metal pigment is improved due to a steric hindrance effect and a pH adjusting action in some cases.

As the pH adjuster which can be added to the aqueous medium, a pH adjuster having a buffering action which can adjust pH to be in a range of 4 to 10 is preferable. In a pH range of 4 to 10, the zeta potential of the base metal pigment (in particular, aluminum and aluminum alloys) becomes negative, and by electrostatic repulsion between the base metal pigments, the water dispersibility of the base metal pigment is improved. Examples of the pH adjuster having such a buffering action include Good's buffers such as 4-(2-hydroxyethyl)-1-piperazine ethane sulfonic acid (HEPES), morpholinoethane sulfonic acid (MES), carbamoylmethyl iminobisacetic acid (ADA), piperazine-1,4-bis(2-ethanesulfonic acid) (PIPES), N-(2-acetamide)-2-aminoethane sulfonic acid (ACES), cholamine chloride, N,N-bis(2-hydroxyethyl)-2-aminoethane sulfonic acid (BES), N-tris (hydroxymethyl)methyl-2-aminoethane sulfonic acid (TES), acetamide glycine, tricine, glycine amide, and bicine, a phosphate buffer solution, and a tris buffer solution.

1.1.4. Physical Properties of Base Metal Pigment

1.1.4.1. XPS Analysis

According to an XPS (X-ray Photoelectron Spectroscopy) analysis, it is possible to obtain information of a top surface (about several nm) of the base metal pigment. The XPS analysis is an analysis method in which X-rays are irradiated to a sample in an ultra-high vacuum, and the photoelectrons emitted are detected. Since the photoelectrons emitted are attributed to the inner shell electrons of an atom of interest, and the energy is different according to each element, it is possible to perform a qualitative analysis by knowing the energy value.

When performing the XPS analysis (incidence angle to the sample surface is 45°, and detection angle is 90°), the concentration of the fluorine element in the base metal pigment included in the aqueous pigment dispersion according to the embodiment is 21 atm % to 35 atm %. It shows that the fluorine-based compound is densely present on the top surface (about several nm) of the base metal pigment. When the concentration of the fluorine element in the base metal pigment is in the range, the waterfastness is significantly improved, and thus, an aqueous pigment dispersion which has excellent metallic glossiness and especially good water dispersibility is obtained. In a case where the concentration of the fluorine element in the base metal pigment is less than the range, the waterfastness is insufficient, and thus, the metallic glossiness is lost by a reaction between the base metal pigment and water and the water dispersibility is also deteriorated. On the other hand, the base metal pigment in which the concentration of the fluorine element of the base metal pigment is greater than the range is also not obtained by research of the present inventors, and there are technical difficulties.

When performing the XPS analysis (incidence angle to the sample surface is 45°, and detection angle is 90°), the concentration of phosphorus, sulfur, nitrogen, or a total of these elements in the base metal pigment included in the aqueous pigment dispersion according to the embodiment is preferably 0.8 atm % or greater. It shows that the fluorine-based compound such as fluorine-based phosphonic acid, fluorine-based sulfonic acid, and salts thereof is densely present by adsorption on the top surface (about several nm) of the base metal pigment. In a case where the concentration of phosphorus, sulfur, nitrogen, or a total of these elements is 0.8 atm % or greater, the waterfastness is significantly improved, and thus, an aqueous pigment dispersion which has excellent metallic glossiness and especially good water dispersibility is obtained.

When performing the XPS analysis (incidence angle to the sample surface is 45°, and detection angle is 90°), the ratio ([F]/[O]) of the concentration of the fluorine element ([F]; atm %) to the concentration of an oxygen element ([O]; atm %) in the base metal pigment included in the aqueous pigment dispersion according to the embodiment is preferably 0.7 to 1.2. The concentration of an oxygen element tends to depend on the origin of the base metal hydroxide included in the base metal pigment, and thus, it also shows that the fluorine-based compound is densely present on the top surface (about several nm) of the base metal pigment. When the ratio ([F]/[O]) of the base metal pigment is in the range, a balance between the concentration of the fluorine element on the base metal pigment surface and the concentration of the oxygen element becomes good, and the waterfastness is significantly improved, and thus, an aqueous pigment dispersion which has excellent metallic glossiness and especially good water dispersibility is obtained.

An X-ray photoelectron spectroscopy apparatus can be used for the analysis, and a commercially available apparatus can be used. As an example of the commercially available measurement apparatus, a "combined electron spectroscopy apparatus" manufactured by THERMO ELECTRON Co., Ltd. can be exemplified.

In a case of using aluminum or an aluminum alloy, when performing the XPS analysis (incidence angle to the sample surface is 45°, and detection angle is 90°), the ratio ([F]/[Al]) of the concentration of the fluorine element ([F]; atm %) to the concentration of an aluminum element ([Al]; atm %) in the base metal pigment included in the aqueous pigment dispersion according to the embodiment is preferably 0.7 to 1.2. It also shows that the fluorine-based compound is densely present on the top surface (about several nm) of the base metal pigment. When the ratio ([F]/[Al]) is in the range, a balance between the concentration of the aluminum element and the concentration of the fluorine element on the base metal pigment surface becomes good, and the waterfastness is significantly improved, and thus, an aqueous pigment dispersion which has excellent metallic glossiness and especially good water dispersibility is obtained.

Furthermore, using the fact that an electron state is changed according to the environment (chemical state) surrounding the atoms and by the change, the peak position is slightly shifted, it is possible to perform a chemical structure analysis. Specifically, by approximating a component corresponding to each chemical state by using the Voigt function (the following separation formula) and performing a peak splitting, it is possible to calculate the ratio of each component.

$$y = y_0 + A \cdot \frac{2\ln 2}{\pi^{3/2}} \frac{w_1}{w_G^2} \cdot \int_{-\infty}^{\infty} \frac{e^{-t^2}}{\left(\sqrt{\ln 2} \frac{w_1}{w_G}\right)^2 + \left(\sqrt{4\ln 2} \frac{x - x_c}{w_G} - t\right)^2} dt$$

($y_0$=offset, $x_c$=center, A=amplitude, $w_G$=Gaussian width, $w_L$=Lorentzian width)

In a case of the base metal pigment which is surface-treated with a fluorine-based phosphonic acid (salt), when approximating an X-ray photoelectron spectroscopy spectrum by using the Voigt function and performing a peak splitting, a peak is obtained at 190 eV to 192 eV. By bonding of the fluorine-based phosphonic acid (salt) to the surfaces of the base particles, a peak of P (phosphorus) chemically shifts between 190 eV and 192 eV. When a peak is present at 190 eV to 192 eV, it means that the fluorine-based phosphonic acid (salt) is reliably bonded to the surfaces of the base particles. Thus, waterfastness is imparted to the base metal pigment, and an aqueous pigment dispersion which has excellent metallic glossiness and especially good water dispersibility is obtained.

In addition, in a case of the base metal pigment which is surface-treated with a fluorine-based compound, a peak is obtained at 291 eV to 293 eV in an X-ray photoelectron spectroscopy spectrum. Since the peak at 291 eV is a peak derived from —$CF_2$— and the peak at 293 eV is a peak derived from —$CF_3$, in a case where peaks are observed at 291 eV and 293 eV, it can be considered that the fluorine-based compound is reliably bonded to the surfaces of the base particles.

1.1.4.2. Shape

The shape of the base metal pigment included in the aqueous pigment dispersion according to the embodiment may be any shape of a spherical shape, a spindle shape, and a needle shape, and a scale shape is preferable. In a case where the shape of the base metal pigment is a scale shape, light reflectivity is good, and thus, it is possible to record an image with excellent metal glossiness.

According to an aspect of the invention, the scale shape refers to a shape in which an area when observed from a predetermined angle (when viewed from the top) is larger than an area when observed from an angle orthogonal to the viewing direction, as a plate shape and a curved plate shape, and in particular, a ratio ($S_1/S_0$) of an area $S_1$ [$\mu m^2$] when observed from the direction in which a projected area is maximized (when viewed from the top) to an area $S_0$ [$\mu m^2$] when observed from the direction in which an area when observed among the direction orthogonal to the viewing direction is maximized is preferably 2 or greater, more preferably 5 or greater, and particularly preferably 8 or greater. As this value, for example, observation is performed for 10 arbitrary particles, and it is possible to adopt an average value of values calculated for these particles.

1.1.4.3. Average Particle Diameter and Average Thickness

An average particle diameter of the base metal pigment included in the aqueous pigment dispersion according to the embodiment is preferably 0.25 μm to 3 μm, and more preferably 0.5 μm to 1.5 μm. In addition, an average thickness of the base metal pigment included in the aqueous pigment dispersion according to the embodiment is preferably 1 nm to 100 nm, and more preferably 10 nm to 70 nm. When the average particle diameter and the average thickness of the base metal pigment is in the range, in a case where the base metal pigment is applied to an aqueous ink composition, it is possible to record an image having excellent smoothness of the coating film and excellent metallic glossiness. In addition, it is possible to manufacture a pigment dispersion with high productivity, and it is also possible to prevent inadvertent deformation of the base metal pigment during manufacturing an aqueous ink composition.

The average particle diameter is represented by a 50% average particle diameter (R50) of equivalent circle diameters determined from the area of a projected image of the base metal pigment obtained by a particle image analyzer. The "equivalent circle diameter" is a diameter of a circle when assuming the circle has the same area as the area of a projected image of the base metal pigment obtained by using a particle image analyzer. For example, in a case where the projected image of the base metal pigment is polygonal, the diameter of a circle obtained by converting the projected image into the circle is referred to as the equivalent circle diameter of the base metal pigment.

The area and the equivalent circle diameter of the projected image of the base metal pigment can be measured using a particle image analyzer. Examples of such a particle image analyzer include a flow-type particle image analyzer FPIA-2100, FPIA-3000, and FPIA-3000S (manufactured by Sysmex Corporation). Moreover, the average particle diameter of the equivalent circle diameter is a particle diameter based on the number of particles. In addition, as a measurement method in a case of using a FPIA-3000 or 3000S, a method of measuring in a HPF measurement mode using a high magnification imaging unit can be exemplified as an example.

Moreover, the average thickness is a thickness obtained as follows. A side image of the base metal pigment is photographed using a transmission electron microscope (TEM) or a scanning electron microscope (SEM), the thicknesses of 10 base metal pigments are determined, respectively, and these are averaged. As the scanning electron microscope (SEM), "JEM-2000EX" manufactured by JEOL Ltd. can be exemplified, and as the scanning electron microscope (SEM), "S-4700" manufactured by Hitachi High-Technologies Corporation can be exemplified.

2. Aqueous Ink Composition

The aqueous ink composition according to the invention contains the aqueous pigment dispersion. Since the aqueous ink composition according to the embodiment contains the aqueous pigment dispersion having excellent water dispersibility, even in a case of being applied to an ink jet printer, clogging of a nozzle due to aggregation of the base metal pigments is suppressed. Thus, the discharging stability of the ink becomes good. In addition, by the effect of fluorine in the fluorine-based compound which is bound to the surface of the base metal pigment, it is possible to lower the surface free energy, and thus, leafing of the base metal pigment is likely to occur while being dried, and it is possible to record an image having excellent metallic glossiness.

According to an aspect of the invention, the "aqueous ink composition" refers to an ink composition in which water is contained in 50% by mass or more, and preferably 70% by mass or more as a liquid medium. As the water, pure water such as ion exchange water, ultrafiltration water, reverse osmosis water, and distilled water, or ultrapure water is preferably used. In particular, since water sterilized by irradiating with ultraviolet rays or adding hydrogen peroxide can prevent the generation of fungi or bacteria over a long period of time, it is preferably used.

The concentration of the base metal pigment in the aqueous ink composition according to the embodiment is preferably 0.1% by mass to 5.0% by mass, more preferably 0.25% by mass to 3.0% by mass, and particularly preferably 0.5% by mass to 2.5% by mass with respect to the total mass of the aqueous ink composition.

In the aqueous ink composition according to the embodiment, resins, a surfactant, alkane diol, polyol, and a pH adjuster can be added as necessary.

The resins have a function of firmly fixing the base metal pigment on a recording medium. Examples of the resins include a homopolymer or a copolymer of acrylic acid, acrylic ester, methacrylic acid, methacrylic ester, acrylonitrile, cyanoacrylate, acrylamide, olefin, styrene, vinyl acetate, vinyl chloride, vinyl alcohol, vinyl ether, vinylpyrrolidone, vinyl pyridine, vinylcarbazole, vinyl imidazole, and vinylidene chloride, a urethane resin, a fluorine resin, and a natural resin. Moreover, the copolymers can be used in any form of a random copolymer, a block copolymer, an alternating copolymer, and a graft copolymer.

As the surfactant, an acetylene glycol-based surfactant or a polysiloxane-based surfactant is preferably contained. The acetylene glycol-based surfactant and the polysiloxane-based surfactant can increase permeability of an ink by increasing wettability to a recording surface of a recording medium or the like. Examples of the acetylene glycol-based surfactant include 2,4,7,9-tetramethyl-5-decyne-4,7-diol, 3,6-dimethyl-4-octyne-3,6-diol, 3,5-dimethyl-1-hexyne-3-ol, and 2,4-dimethyl-5-hexyne-3-ol. In addition, as the acetylene glycol-based surfactant, commercially available products can be used, and examples thereof include Olfine E1010, STG, and Y (manufactured by Nissin Chemical Industry Co., Ltd.), and Surfinol 104, 82, 465, 485, and TG (manufactured by Air Products and Chemicals Inc.). As the polysiloxane-based surfactant, commercially available products can be used, and examples thereof include BYK-347 and BYK-348 (manufactured by BYK Japan KK). Furthermore, other surfactants such as an anionic surfactants, nonionic surfactants, and amphoteric surfactants can also be added to the aqueous ink composition.

Alkane diol can increase permeability of an ink by increasing wettability to a recording surface of a recording medium or the like. As the alkane diol, 1,2-alkane diols having 4 to 8 carbon atoms such as 1,2-butanediol, 1,2-pentanediol, 1,2-hexane diol, 1,2-heptane diol, and 1,2-octane diol are preferable. Among these, 1,2-hexane diol, 1,2-heptane diol, and 1,2-octane diol having 6 to 8 carbon atoms are more preferable since permeability to a recording medium is particularly high.

For example, in a case where the aqueous ink composition is applied to an ink jet recording apparatus, polyol can suppress drying of the aqueous ink composition, and it is possible to prevent clogging of the aqueous ink composition in an ink jet recording head portion. Examples of the polyol include ethylene glycol, diethylene glycol, triethylene glycol, polyethylene glycol, polypropylene glycol, propylene glycol, butylene glycol, 1,2,6-hexane triol, thioglycol, hexylene glycol, glycerin, trimethylol ethane, and trimethylol propane.

Examples of the pH adjusting agent include dipotassium hydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, and sodium hydrogen carbonate.

In addition, additives including a fixing agent such as water-soluble rosin, an antifungal agent and a preservative such as sodium benzoate, an antioxidant and an ultraviolet absorbent such as allophanates, a chelating agent, and an oxygen absorber can be added to the aqueous ink composition according to the embodiment. These additives can be used alone, or two or more kinds thereof can be used in combination.

Moreover, the aqueous ink composition according to the embodiment preferably substantially does not contain a polymerizable compound. Here, the expression "substantially does not contain" means the extent that a polymerizable compound is not intentionally added to the aqueous ink composition, and a polymerizable compound previously included in an additive to be added when adjusting the aqueous ink composition may also be contained. Thus, the metallic glossiness of an image to be recorded becomes good in some cases. Moreover, in a case where the aqueous ink composition contains a polymerizable compound, a problem in which the stability of the composition (storage stability) is poor and the discharging stability due to an increase in viscosity by gelation is decreased arises in some cases.

Examples of such a polymerizable compound include a radically polymerizable compound and a cationically polymerizable compound. Examples of the radical polymerizable compound include an allyl compound, and more preferably, an allyl ether compound, ethylene glycol monoallyl ether, trimethylolpropane diallyl ether, trimethylolpropane monoallyl ether, glycerin monoallyl ether, allyl glycidyl ether, pentaerythritol triallyl ether, (meth)acrylic acid, a (meth)acrylic acid compound, and a vinyl compound. Examples of the cationically polymerizable compound include an epoxy compound, a vinyl ether compound, and an oxetane compound disclosed in each publication of JP-A-6-9714, JP-A-2001-310937, JP-A-2001-220526, and the like.

The aqueous ink composition according to the embodiment, of which the application is not particularly limited, for example, can be applied to a writing instrument, a stamp, a recorder, a pen plotter, or an ink jet recording apparatus.

The viscosity of the aqueous ink composition according to the embodiment at 20° C. is preferably 2 mPa·s to 10 mPa·s, and more preferably 3 mPa·s to 5 mPa·s. When the viscosity of the aqueous ink composition according to the embodiment at 20° C. is in the range, the aqueous ink composition is discharged from the nozzles in an appropriate amount and it is possible to further reduce a flying bend or scattering of the aqueous ink composition, and thus, it is possible to suitably use in an ink jet recording apparatus.

3. Examples

Hereinafter, the invention will be specifically described based on Examples, but the invention is not limited thereto "parts" and "%" in Examples and Comparative Examples are all by mass, unless specified otherwise. .

3.1. Manufacture of Aqueous Pigment Dispersion

3.1.1. Example 1

First, a film with smooth surfaces manufactured by polyethylene phthalate was prepared (surface roughness Ra is 0.02 μm or less).

Then, the entire surface of one side of the film was coated with silicone oil. A film constituted with aluminum (hereinafter, also simply referred to as "aluminum film") was formed on the surface side which was coated with the silicone oil by a vapor deposition method.

Next, the film on which aluminum film was formed was put in diethylene glycol diethyl ether, and by irradiating with ultrasonic waves, the aluminum film was peeled from the film and pulverized. Next, this was charged in a homogenizer, and a pulverization treatment was performed for about 8 hours, whereby a dispersion of scale shape aluminum particles (base particles) was obtained. The concentration of the aluminum particles in this dispersion was 10% by mass.

Next, 100 parts by mass of diethylene glycol diethyl ether was added thereto with respect to 100 parts by mass of the dispersion containing the aluminum particles obtained in the manner, the concentration of the aluminum particles was adjusted to be 5% by mass, 50 parts by mass of 2-(perfluorohexyl)ethylphosphonic acid was added thereto with respect to 100 parts by mass of the aluminum particles, and a surface treatment of the aluminum particles was performed at a liquid temperature of 55° C. while irradiating with ultrasonic waves for 3 hours. Then, the surface-treated aluminum particles were centrifugally precipitated by a centrifugal separator (10,000 rpm×30 min) and the supernatant portion was discarded. An aqueous medium (a mixture of 1 part by mass of olefin E1010 (manufactured by Nissin Chemical Industry Co., Ltd.), 47.65 parts by mass of water, and 50 parts by mass of propylene glycol) was added thereto, and by irradiating with ultrasonic waves, the surface-treated aluminum particles were redispersed, whereby an aqueous pigment dispersion containing 5 parts by mass of aluminum particles was obtained.

The average particle diameter of the aluminum particles in the aqueous pigment dispersion was 0.8 μm, and the average thickness was 10 nm.

3.1.2. Examples 2 and 3, and Comparative Examples 1 and 2

Aqueous pigment dispersions of the aluminum particles surface-treated in the same manner as in Example 1 except that the added amounts of 2-(perfluorohexyl)ethylphosphonic acid were the amounts shown in Table 1 were manufactured.

3.1.3. Examples 4 and 5

Aqueous pigment dispersions of the aluminum particles surface-treated in the same manner as in Example 1 except that the fluorine-based compound used in the surface treatment was changed to those described in Table 1 and the added amounts were the amounts shown in Table 1 were manufactured.

TABLE 1

| | Constituting material of base particles | Surface treating agent | Amount (parts by mass) of surface treating agent with respect to 100 parts by mass of base particles | Shape | Average particle diameter [μm] | Average thickness [nm] |
|---|---|---|---|---|---|---|
| Example 1 | Al | FHP | 50 | Scale shape | 0.8 | 8 |
| Example 2 | Al | FHP | 30 | Scale shape | 0.8 | 8 |
| Example 3 | Al | FHP | 20 | Scale shape | 0.7 | 8 |
| Example 4 | Al | FHPA | 20 | Scale shape | 0.9 | 8 |
| Example 5 | Al | FBS | 20 | Scale shape | 0.8 | 8 |
| Comparative Example 1 | Al | FHP | 15 | Scale shape | 0.8 | 8 |
| Comparative Example 2 | Al | FHP | 10 | Scale shape | 0.9 | 8 |

Moreover, abbreviations for the surface treating agents shown in Table 1 are as follows.

FHP: 2-(perfluorohexyl)ethyl phosphonic acid
FHPA: 2-(perfluorohexyl)ethyl phosphonic acid amine salt
FBS: perfluorobutane sulfonate

3.2. XPS Analysis

The obtained aqueous pigment dispersion was dropped to a membrane filter made of a polytetrafluoroethylene to be filtered, whereby the surface-treated aluminum particles were separated. The surface-treated aluminum particles were sufficiently dried and used as a sample for an XPS analysis.

Next, the sample for the XPS analysis was fixed on the sample stage of an X-ray photoelectron spectroscopy apparatus shown below, a presence ratio of each element of the aluminum particle surface was measured under the following conditions. The results are shown in Table 2.

X-ray photoelectron spectroscopy apparatus: Type "combined electron spectroscopy apparatus", manufactured by THERMO ELECTRON Co., Ltd.
X-ray light source: Monochromated Al—Kα line
X-ray irradiation angle: 90°
Energy: 1486.6 eV
Spot diameter: 500μϕ
Step size: 0.1 eV
Dwell time (dwell time at each measurement point): 100 μs
Pass energy: 20 eV In addition, for the aluminum particles contained in the aqueous pigment dispersion obtained in Example 1, when a waveform separation was performed by Voigt function in the X-ray photoelectron spectroscopy spectrum measured by the X-ray photoelectron spectroscopy apparatus, peaks were confirmed at 190 eV to 192 eV. From this, it was made clear that 2-(perfluorohexyl)ethyl phosphonic acid was bonded to the surfaces of the aluminum particles. Moreover, also in the aluminum particles contained in the aqueous pigment dispersion obtained in Examples 2 to 4 and Comparative Examples 1 and 2, same peaks were confirmed.

In addition, for the aluminum particles contained in the aqueous pigment dispersion obtained in Example 1, in the X-ray photoelectron spectroscopy spectrum measured by the X-ray photoelectron spectroscopy apparatus, peaks were confirmed at 291 eV and 293 eV. Since the peak at 291 eV is a peak derived from —$CF_2$— and the peak at 293 eV is a peak derived from —$CF_3$, it was made clear that 2-(perfluorohexyl)ethyl phosphonic acid was present on the surfaces of the particles made of aluminum. Moreover, also in the particles made of aluminum contained in the aqueous pigment dispersion obtained in Examples 2 to 5 and Comparative Examples 1 and 2, same peaks were confirmed.

3.3. Evaluation Test

3.3.1. Water Dispersibility Evaluation Test

By the amount of the obtained aqueous pigment dispersion passing through a filter (Mitex Membrane Filters (model number: LCWPO 4700) manufactured by Millipore Corporation) of 10 μm, water dispersibility was evaluated. The evaluation criteria of water dispersibility were as follows. The results of the water dispersibility evaluation tests are shown in Table 2.
"A" .... The amount of passing through a filter was 50 mL or greater.
"B" .... The amount of passing through a filter was 10 mL to 50 mL.
"C" .... The amount of passing through a filter was less than 10 mL.

3.3.2. Storage Stability Evaluation Test 10 mL of the obtained aqueous pigment dispersion was put into a sample bottle, the bottle was tightly capped, and stored at a constant temperature of 70° C. for 6 days. By visually observing the aqueous pigment dispersion after the storage, the storage stability was evaluated. The evaluation criteria of the storage stability were as follows. The results of the storage stability evaluation tests are shown in Table 2.

"A" .... Whitening of the aluminum particles was not observed.
"B" .... Whitening was observed in a part of the aluminum particles.
"C" .... Whitening was observed in all the aluminum particles.

3.3.3. Evaluation of Glossiness

Any one type of the obtained aqueous pigment dispersions was dropped and coated on photographic paper ("PM photo paper (glossy) model: KA450PSK", manufactured by Seiko Epson Corporation), followed by drying at room temperature for one day. By observing the obtained sample visually or by a scanning electron microscope (S-4700, manufactured by Hitachi High-Technologies Corporation, hereinafter also referred to as "SEM"), the glossiness of the aluminum particles was evaluated. The evaluation criteria of the glossiness of the aluminum particles were as follows. The results of the glossiness evaluation tests are shown in Table 2.
"A" .... Glossiness was good (the aluminum particles had excellent metallic glossiness, and specular gloss.)
"B" .... Glossiness was slightly good (the aluminum particles had excellent metallic glossiness, and slightly had a matte tone.)
"C" .... Glossiness was poor (the aluminum particles did not have metallic glossiness, and exhibited a gray dark.)

3.3.4. Evaluation Results

The results of the water dispersibilities, the storage stabilities, and the glossinesses of the aqueous pigment dispersions obtained in Examples 1 to 5 and Comparative Examples 1 and 2 are shown in Table 2.

TABLE 2

| | Element concentration (atm %) | | | | | | | Concentration ratio | | Evaluation result | | |
|---|---|---|---|---|---|---|---|---|---|---|---|---|
| | Al | P | C | N | O | F | S | F/O | F/Al | Water dispersibility | Storage stability | Glossiness |
| Example 1 | 23.8 | 1.3 | 20.8 | 0.0 | 27.5 | 26.6 | 0.0 | 0.97 | 1.12 | A | A | A |
| Example 2 | 22.7 | 1.3 | 27.0 | 0.0 | 24.6 | 24.4 | 0.0 | 0.99 | 1.07 | A | A | A |
| Example 3 | 24.2 | 1.1 | 25.6 | 0.0 | 25.5 | 23.6 | 0.0 | 0.93 | 0.98 | A | B | B |
| Example 4 | 24.7 | 0.9 | 24.5 | 0.5 | 26.3 | 23.1 | 0.0 | 0.88 | 0.94 | A | B | B |
| Example 5 | 23.1 | 0.0 | 25.3 | 0.0 | 26.3 | 24.1 | 1.2 | 0.92 | 1.04 | B | A | B |
| Comparative Example 1 | 26.0 | 1.0 | 24.4 | 0.4 | 27.4 | 20.8 | 0.0 | 0.76 | 0.80 | B | C | B |
| Comparative Example 2 | 27.3 | 0.7 | 26.5 | 0.4 | 29.9 | 15.2 | 0.0 | 0.51 | 0.56 | C | C | C |

According to the evaluation results in Table 2, it was found that for the aqueous pigment dispersion containing the aluminum particles in which the concentration of a fluorine element by the XPS analysis was 21 atm % to 35 atm %, the water dispersibility and the storage stability were good, and the glossiness of the recorded matter was also excellent. On the other hand, it was found that for the aqueous pigment dispersion containing the aluminum particles in which the concentration of a fluorine element by the XPS analysis was less than 21 atm %, the water dispersibility and the storage stability were poor, and the glossiness of the recorded matter was also poor. From the above, it was found that when the fluorine element concentration of the base metal pigment surface by the XPS analysis was at least 21 atm %, sufficient waterfastness is imparted, and the water dispersibility, the storage stability, and the glossiness were good.

3.4. Evaluation of Aqueous Ink Composition

3.4.1. Preparation of Aqueous Ink Composition

The aqueous pigment dispersion, propylene glycol, 2-methyl-2,4-pentanediol, triethanolamine, and F-553 were mixed so as to be the following composition, and then ion exchange water was added so as to be 100 parts by mass, followed by mixing and stirring.

Composition of Aqueous Ink Composition

| | |
|---|---|
| Aqueous pigment dispersion (solid content) | 1.2 parts by mass |
| Propylene glycol | 35 parts by mass |
| 2-methyl-2,4-pentanediol 50 | 15 parts by mass |
| Olfine E1010 | 0.24 parts by mass |
| Megafac F-553 | 0.36 parts by mass |
| Triethanolamine | 0.15 parts by mass |
| Ion exchange water | residual part |
| Total | 100 parts by mass |

Moreover, as the aqueous pigment dispersion, any one type of the aqueous pigment dispersions in Examples 1 and 3, and Comparative Example 1 obtained above was used.

3.4.2. Evaluation

An ink cartridge in which the aqueous ink composition was filled into a dedicated cartridge of an ink jet printer PX-G930 (manufactured by Seiko Epson Corporation) for producing a sample was produced. Next, the obtained ink cartridge was mounted on a black array of the ink jet printer PX-G930, and commercially available ink cartridges were mounted on nozzle arrays other than the black array. Moreover, the commercially available ink cartridges mounted other than the black array were intended to be used as a dummy, these were not used in the evaluation in Examples, and thus, these were not involved in the effects of an aspect of the invention.

Next, by discharging the aqueous ink composition mounted on the black array on the photo paper "gloss" (manufactured by Seiko Epson Corporation) using the printer, a recorded matter in which a solid pattern image was printed was obtained. Moreover, as the printing conditions, discharging ink weight per dot was 20 ng, and a resolution was 720 dpi vertically and 720 dpi horizontally.

3.4.3. Evaluation Method of Image

For the obtained image, the glossiness at 60° was measured using a gloss meter Multi Gloss 268 (manufactured by Konica Minolta, Inc.). The evaluation criteria of the glossiness of the obtained image were as follows. The results of the glossiness evaluation tests are shown in Table 3.

"A": Glossiness was 300 or greater (clear metallic gloss)

"B": Glossiness was 250 or greater and less than 300 (matte metallic gloss)

"C": Glossiness was 200 or greater and less than 250 (no metallic gloss)

"D": Unmeasurable (the aqueous ink composition could not be discharged.)

TABLE 3

| Characteristics of aqueous ink composition | Kind of aqueous pigment dispersion | Image obtained in Example 1 | Image obtained in Example 3 | Image obtained in Comparative Example 1 |
|---|---|---|---|---|
| Evaluation result | Gloss evaluation | A | B | D |

As shown in Table 3, in the aqueous ink composition produced using the aqueous pigment dispersion in Example 1, it was possible to print images having a clear metallic gloss with the glossiness of 300 or greater. In the aqueous ink composition produced using the aqueous pigment dispersion in Example 3, the glossiness was 250 or greater and less than 300, and the glossiness was slightly impaired compared to that of the image printed with the aqueous ink composition produced using the aqueous pigment dispersion in Example 1.

On the other hand, in the aqueous ink composition produced using the aqueous pigment dispersion in Comparative Example 1, it was not possible to discharge ink from a head of an ink jet recording apparatus, and it was not possible to record an image. It is considered that the aluminum particles in the aqueous ink composition aggregated, particle diameters were increased due to this, and thus clogging of the head portion occurs.

The invention is not limited to the embodiments and various modifications are possible. For example, the invention includes substantially the same configuration (for example, a configuration in which functions, methods, and results are the same or a configuration in which the purposes or effects are the same) as the configuration described in the embodiments. In addition, the invention includes configurations in which non-essential parts of the configurations described in the embodiments are replaced. In addition, the invention includes configurations exhibiting the same action effects as the configurations described in the embodiments or configurations which can achieve the same object. In addition, the invention includes a configuration made by adding a known technology to the configuration described in the embodiments.

The entire disclosure of Japanese Patent Application No. 2013-208131, filed Oct. 3, 2013 is expressly incorporated by reference herein.

What is claimed is:

1. An aqueous pigment dispersion for ink jet printing, comprising:
   water; and
   a base metal pigment,
   wherein the base metal pigment is a base metal pigment which is surface-treated with a fluorine-based compound, the fluorine-based compound containing at least one of the elements among phosphorus, sulfur, and nitrogen, and
   when performing an X-ray Photoelectron Spectroscopy (XPS) analysis of a base metal pigment surface, a concentration of a fluorine element is 21 atm % to 35 atm % and a concentration of the at least one of the phosphorus, the sulfur, the nitrogen or a total of the elements if the fluorine-based compound contains a plurality of the elements is 0.8 atm % or greater.

2. The aqueous pigment dispersion for ink jet printing according to claim 1,
   wherein the fluorine-based compound has a perfluoroalkyl group.

3. The aqueous pigment dispersion for ink jet printing according to claim 2, wherein the number of carbon atoms in the perfluoroalkyl group is 1 to 6.

4. The aqueous pigment dispersion for ink jet printing according to claim 1,
wherein when performing the XPS analysis of the base metal pigment surface, a ratio ([F]/[O]) of a concentration of the fluorine element ([F]; atm %) to a concentration of an oxygen element ([O]; atm %) is 0.7 to 1.2.

5. The aqueous pigment dispersion for ink jet printing according to claim 1,
wherein a base metal included in the base metal pigment is aluminum or an aluminum alloy.

6. The aqueous pigment dispersion for ink jet printing according to claim 5,
wherein when performing the XPS analysis of the base metal pigment surface, a ratio ([F]/[Al]) of a concentration of the fluorine element ([F]; atm %) to a concentration of an aluminum element ([Al]; atm %) is 0.7 to 1.2.

7. The aqueous pigment dispersion for ink jet printing according to claim 1,
wherein a molecular weight of the fluorine-based compound is 1,000 or less.

8. An aqueous ink composition for ink jet printing, comprising:
water in an amount of 50% by mass or more; and
the aqueous pigment dispersion according to claim 1,
wherein the concentration of the base metal pigment in the aqueous ink composition is 0.1% by mass to 5.0% by mass with respect to the total mass of the aqueous ink composition.

9. An aqueous ink composition for ink jet printing, comprising:
water in an amount of 50% by mass or more; and
the aqueous pigment dispersion according to claim 2,
wherein the concentration of the base metal pigment in the aqueous ink composition is 0.1% by mass to 5.0% by mass with respect to the total mass of the aqueous ink composition.

10. An aqueous ink composition for ink jet printing, comprising:
water in an amount of 50% by mass or more; and
the aqueous pigment dispersion according to claim 3,
wherein the concentration of the base metal pigment in the aqueous ink composition is 0.1% by mass to 5.0% by mass with respect to the total mass of the aqueous ink composition.

11. An aqueous ink composition for ink jet printing, comprising:
water in an amount of 50% by mass or more; and
the aqueous pigment dispersion according to claim 4,
wherein the concentration of the base metal pigment in the aqueous ink composition is 0.1% by mass to 5.0% by mass with respect to the total mass of the aqueous ink composition.

12. An aqueous ink composition for ink jet printing, comprising:
water in an amount of 50% by mass or more; and
the aqueous pigment dispersion according to claim 5,
wherein the concentration of the base metal pigment in the aqueous ink composition is 0.1% by mass to 5.0% by mass with respect to the total mass of the aqueous ink composition.

13. An aqueous ink composition for ink jet printing, comprising:
water in an amount of 50% by mass or more; and
the aqueous pigment dispersion according to claim 6,
wherein the concentration of the base metal pigment in the aqueous ink composition is 0.1% by mass to 5.0% by mass with respect to the total mass of the aqueous ink composition.

14. An aqueous ink composition for ink jet printing, comprising:
Water in an amount of 50% by mass or more; and
the aqueous pigment dispersion according to claim 7,
wherein the concentration of the base metal pigment in the aqueous ink composition is 0.1% by mass to 5.0% by mass with respect to the total mass of the aqueous ink composition.

15. The aqueous ink composition for ink jet printing according to claim 8, which substantially does not contain a polymerizable compound.

16. The aqueous ink composition for ink jet printing according to claim 9, which substantially does not contain a polymerizable compound.

17. The aqueous ink composition for ink jet printing according to claim 10, which substantially does not contain a polymerizable compound.

* * * * *